US012123245B2

(12) United States Patent
Haensch et al.

(10) Patent No.: US 12,123,245 B2
(45) Date of Patent: Oct. 22, 2024

(54) METHOD FOR OPERATING A DOOR SYSTEM

(71) Applicant: dormakaba Deutschland GmbH, Ennepetal (DE)

(72) Inventors: Holger Haensch, Ennepetal (DE); Chandra Gupta, Ennepetal (DE); Martin Boeckhoff, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 326 days.

(21) Appl. No.: 17/668,088

(22) Filed: Feb. 9, 2022

(65) Prior Publication Data

US 2022/0268086 A1 Aug. 25, 2022

(30) Foreign Application Priority Data

Feb. 12, 2021 (EP) .................................... 21156785

(51) Int. Cl.
*E05F 15/73* (2015.01)

(52) U.S. Cl.
CPC ........... *E05F 15/73* (2015.01); *E05Y 2400/44* (2013.01); *E05Y 2400/45* (2013.01); *E05Y 2900/132* (2013.01)

(58) Field of Classification Search
None
See application file for complete search history.

(56) References Cited

U.S. PATENT DOCUMENTS

| | | | | |
|---|---|---|---|---|
| 5,583,405 | A * | 12/1996 | Sai | E05F 15/73 318/468 |
| 2001/0048470 | A1* | 12/2001 | Lampert | G06V 20/52 348/143 |
| 2017/0306685 | A1* | 10/2017 | Harding | E05F 15/00 |
| 2021/0222479 | A1* | 7/2021 | Dreyer | E05F 15/73 |

FOREIGN PATENT DOCUMENTS

| | | | |
|---|---|---|---|
| EP | 0696670 | A1 | 2/1996 |
| EP | 0853299 | A2 | 7/1998 |
| EP | 0853299 | A3 | 6/1999 |
| WO | 9517574 | A1 | 6/1995 |
| WO | 2008084058 | A2 | 7/2008 |
| WO | 2008084058 | A3 | 7/2008 |

* cited by examiner

*Primary Examiner* — Lina Cordero
(74) *Attorney, Agent, or Firm* — CANTOR COLBURN LLP

(57) ABSTRACT

A method for operating a door system having a door leaf, which is movable by a door actuator, and having a sensor unit, which is arranged at a height above a floor of the door system and with which the approach of a person towards the door leaf is detected by a control unit, includes at least the following steps: determining a direct distance between the sensor unit and the person using the sensor unit; determining a horizontal distance between the sensor unit and the door leaf by a geometric relationship of the person, of the door leaf and of the height of the sensor unit; and determining the probable approach time of the person on the basis of the determined horizontal distance and opening the door leaf. A door system having a control unit may be used to carry out the method.

12 Claims, 2 Drawing Sheets

METHOD FOR OPERATING A DOOR SYSTEM

CROSS-REFERENCE TO RELATED APPLICATIONS

This application is related to and claims the benefit of European Patent Application No. 21156785.4, filed on Feb. 12, 2021, the contents of which are herein incorporated by reference in their entirety.

TECHNICAL FIELD

The disclosure relates to a method for operating a door system having a door leaf, which is movable by means of a door actuator, and having a sensor unit, which is arranged at a height above a floor of the door system and with which the approach of a person towards the door leaf is detected by means of a control unit. The disclosure is also aimed at a door system having a control unit, with which such a method can be carried out.

BACKGROUND

The automatic operation of door systems with one or a plurality of door leaves is known for sliding doors and for swing leaf doors. The sensor units, which are generally arranged stationarily above the door leaves on the lintel or on the wall, in which the door system is installed, are located at a significant height above the floor, with the floor of the door system usually also being the ground, which forms the region before and behind the door leaf and which is walked on by people.

In the case of the operation of automatic door systems, the requirement has increasingly arisen in recent years to provide a demand-based control of the movement of the door leaf, in particular to actuate the movement of the door leaf as far as possible such that one or a plurality of people can pass the door system unimpeded, but the door leaf does not remain in the opening position for example longer than is necessary. This also includes the door leaf not being opened unnecessarily early, in particular during cold weather.

Precisely when sensor units with radar sensors are used, distances, speeds and movement directions of people can be detected with the radar sensors, and the information about one or a plurality of detected people is transmitted to a control unit of the door system, which ultimately calculates corresponding movement parameters for the door leaf. These movement parameters are in this respect based on the measurement values of the at least one sensor unit, and the sensory detection for example of one or a plurality of people can certainly be prone to error. In this respect, it is desirable to reduce, as far as possible, and, in particular, to prevent defective sensor data being supplied to a control unit by means of sensors.

For example, WO 2008/084058 A2 discloses a door system having a door leaf, and above the door leaf is arranged a sensor unit, which in this respect is positioned at a significant height above the floor of the door system. Short people, for example children, are detected more from above than from in front primarily in the near region before the door leaves such that the sensor data from the sensor unit provided to the control unit is only qualified to a limited extent in order to provide effectively adapted movement of at least one door leaf, in particular of a swing leaf.

SUMMARY

The disclosure provides an improved operation of a door system having a door leaf and this should enable improved detection of objects, in particular people, in order to provide high data quality to a control unit in order to actuate the door leaf of the door system as optimally as possible.

This is achieved by proceeding from a method according to the preamble of the claim 1 and proceeding from a door system according to claim 11 each with the characterizing features. Advantageous further developments of the disclosure are indicated in the dependent claims.

The method according to the disclosure has at least the following steps: Determining a direct distance between the sensor unit and the person by means of the sensor unit; Determining a horizontal distance between the person and the door leaf by means of a geometric relationship between the position of the person, of the door leaf and of the height of the sensor unit; Determining the probable approach time of the person on the basis of the determined horizontal distance and opening the door leaf.

The core idea of the disclosure is to eliminate, by way of calculation, the often great height of the arrangement of the sensor units above the floor relative to the person such that the sensor unit delivers measurement data which no longer includes the height error of the sensor unit or the sensor unit can deliver conventional measurement data and the great assembly height of the sensor unit above the door leaf can be deducted in the control unit.

The result is improved data quality for actuating the door leaf since the distance of the person from the door system can be determined notably more accurately. Consequently, the movement of the door leaf can also be actuated in an improved manner. The direct distance between the sensor unit and the person relates here to the distance running obliquely in the geometric relationship when it must be assumed that the sensor unit is arranged notably higher than the height of the person, for example a child. This effect comes to bear in particular in the case of very high doors and when children enter the door system.

The horizontal distance can for example be the distance of the person from the door system, which results directly above the floor of the door system, with the horizontal distance also even being sufficiently accurately determined when it can be determined at a distance above the floor, which, is, however, not greater than the height of the person. In this case, recording the distance of the person, the movement speed or also the movement direction of the person is a question of aligning the so-called radar lobes, which is dependent on the arrangement of the radar antenna. Regardless of the alignment of the radar antenna and therefore of the radar lobes, the elimination of the assembly height of the sensor unit by way of calculation can, however, lead to a significant improvement of the data quality which is delivered by the sensor unit or which is calculated by the control unit to control the door leaf.

Advantageously, by means of the geometric relationship, a correction value is determined which forms a factor between the direct distance and the determined horizontal distance from: $D' \cdot k = D$. The correction value is designated here with k and the direct distance is designated with D' such that ultimately the horizontal distance is designated with D.

The probable approach time is the time still to lapse when the person moves towards the door system at the determined distance and the determined approach speed. In order to accurately determine the probable approach time according to the distance-time law, it is therefore necessary to determine the substantially horizontal distance between the person and the door system. If, according to the disclosure, the great assembly height of the sensor unit is deducted using the geometric relationship and the horizontal distance forms the basis for the distance-time law, then the probable approach time of the person until they reach the door system can ultimately be determined notably more accurately than with conventional methods.

For example, the geometric relationship is based on determining an angle between a limb in the course of the direct distance and a limb in the course of the horizontal distance. The angle can be found in particular from: $\upsilon=\sin^{-1}(h/D')$. The correction value is determined in particular from: $k=\cos(\upsilon)$.

The correction value can in particular change with the approach of the person towards the door system since the angle between the horizontal and the direct distance between person and sensor unit is continuously enlarged with the increasing approach of the person towards the door system.

The door system in particular has a door actuator, which is actuated by the control unit, with the door actuator in particular also including the control unit. In this case, the correction value of the horizontal distance and ultimately the probable approach time are determined in particular with the control unit. However, it is also conceivable here that at least the determination of the horizontal distance in relation to the person is already carried out with the sensor unit such that the value corrected by the correction factor k is sent from the sensor unit to the control unit.

Further advantageously, the control device can have a RAM memory in which the correction value k is stored. The method provides here in particular that after assembling the sensor unit, the height of the sensor unit above the floor is determined and the resulting correction value k is stored in the RAM memory.

It is also conceivable that when the door system is installed with the door actuator, the height of the installed sensor unit above the floor is manually input in the control unit by an operator. By inputting the height h into the control unit, the correction value can therefore also be determined inside the controller since only the assembly height h of the sensor unit has to be determined as a variable when the door system is assembled.

A correction value is preferably only determined when the deviation of the direct distance between the sensor unit and the person and the determined horizontal distance is more than 10%. As a result, the required computing power is reduced such that the calculation does not have to run each time the door system is entered. This is in particular advantageous when a plurality of people enter the door systems simultaneously.

In particular, a door system is being protected with which the method according to the disclosure can be carried out in accordance with one of claims 1 to 10.

The door system is in particular designed as an automatic sliding door system, as a folding leaf door system, as a pivot leaf door system or as a revolving door system.

Features and details, which are described in connection with the method according to the disclosure, also apply in connection with the door system according to the disclosure and vice versa. In this case, the features mentioned in the description and in the claims may each be essential to the disclosure individually by themselves or in combination.

The disclosure is also aimed at a computer program product for implementation in a control unit of a door system with the features described above, which is designed to carry out the method according to the disclosure in accordance with the above description.

BRIEF DESCRIPTION OF THE DRAWINGS

Further measures that improve the disclosure will be outlined in greater detail below together with the description of a preferred exemplary embodiment of the disclosure on the basis of the figures, in which is shown.

DETAILED DESCRIPTION OF THE DRAWINGS

Figure 1:
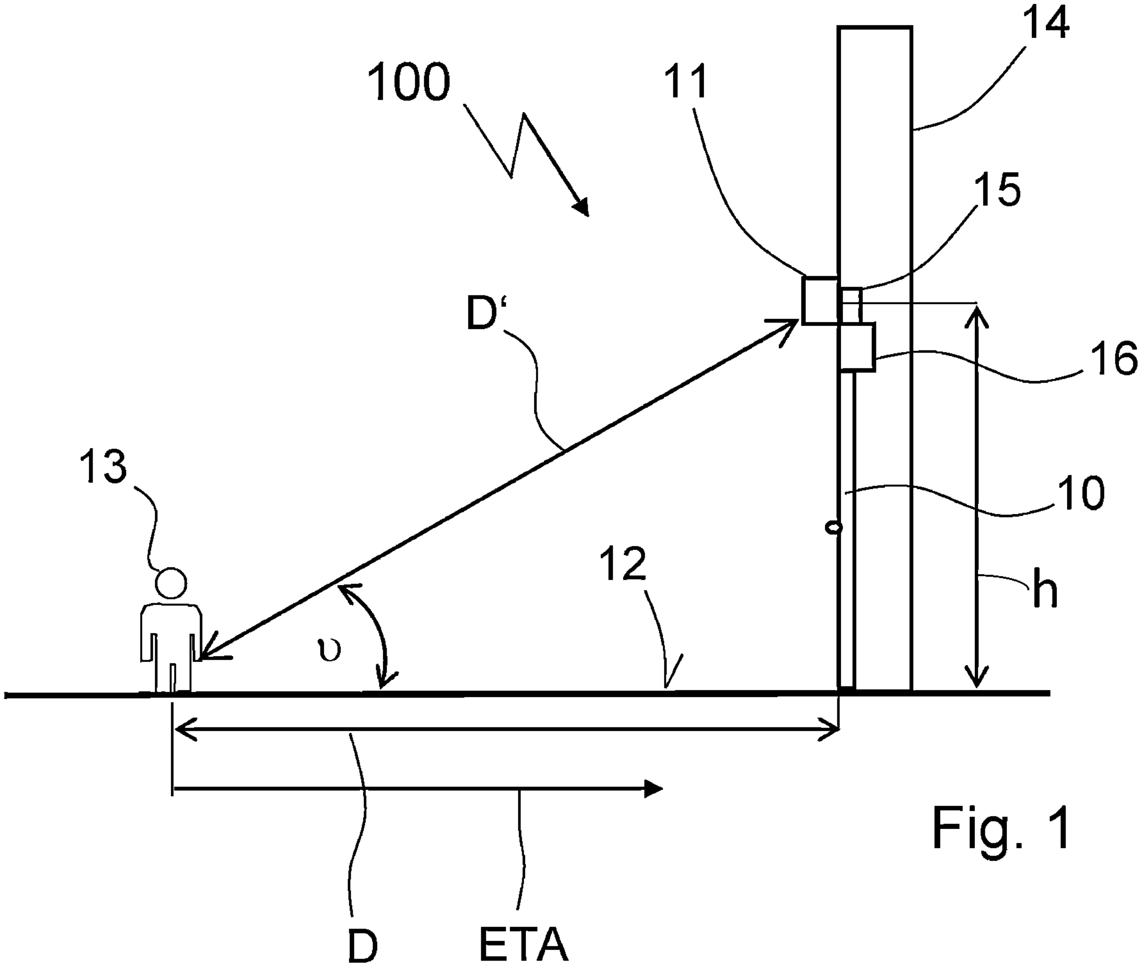
FIG. 1 a first schematic representation of a door system having a sensor unit arranged above a door leaf, with the door system being entered by a person, and FIG. 2 the door system according to FIG. 1 with the person who has approached further to the door system.

FIG. 1 shows a door system 100 in a wall 14 and the door system 100 has a door leaf 10, which is represented in a closed position. A sensor unit 11 is arranged above the door leaf 10. The sensor unit 11 is mounted at the height h above the floor 12, with the floor 12 also forming part of the passage region of the door system 100, which in this respect has the same height.

The person 13 is located at a horizontal distance D away from the door system 100. Based on the assembly height h of the sensor unit 11, a direct distance D' between the person 13 and the sensor unit 11 results and the direct distance D' runs obliquely and is therefore longer than the horizontal distance D between the person 13 and the door system 100.

If the door system 100 is operated, then the following method is carried out with the control unit 15: Determining the direct distance D' between the sensor unit 11 and the person 13 by means of the sensor unit 11 by conventionally detecting the person 13; Determining a horizontal distance D between the person 13 and the door leaf 10 by means of a geometric relationship between the position of the person 13, the position of the door leaf 10 and the position of the sensor unit 11 of the height h; and the probable approach time ETA of the person 11 is determined on the basis of the determined horizontal distance D', according to which the opening of door leaf 10 is ultimately triggered by the control unit 15.

The probable approach time ETA is the time which the person 13, in relation to their current position and in relation to the current movement speed towards the door system 100, requires to arrive at the door system 100 and pass it. The control unit 15 can ultimately determine an optimal movement of the door leaf 10 on the basis of the approach time ETA, in particular in terms of the opening time, the opening hold period and the subsequent closing of the door leaf 10. The horizontal distance D can for example be determined by means of the Pythagoras' Theorem or on the basis of the relationship $\upsilon=\sin^{-1}(h/D')$.

Figure 2:
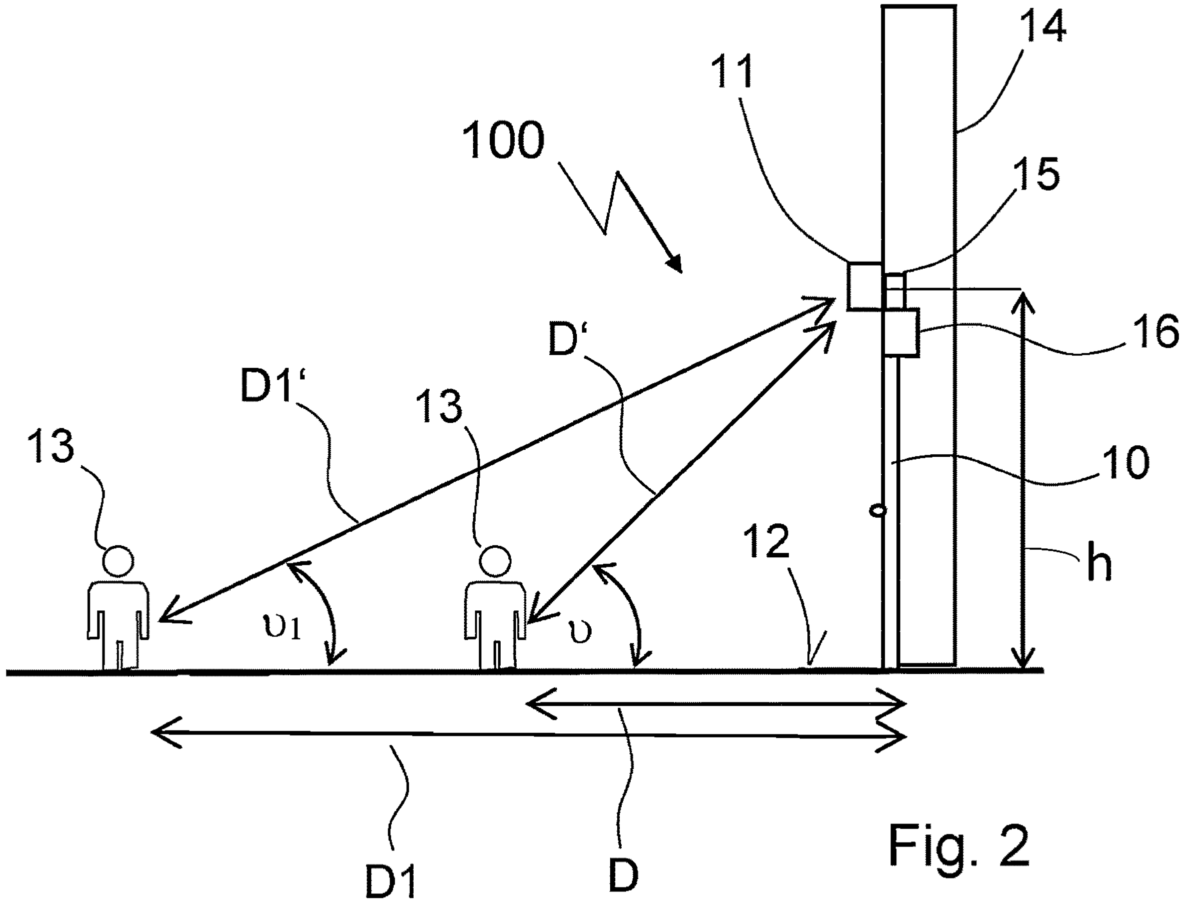

FIG. 2 shows the door system 100 according to FIG. 1 with the door leaf 10, the control unit 15 and the door actuator 16 in arrangement on the wall 14. The sensor unit 11 is arranged above the door leaf 10 at the height h. The person 13 has already moved further towards the door system 100, compared to the first position with the horizontal distance D1 such that the distance D1 is reduced to D. Therefore, the direct distance D1' is also reduced to D'. The direct distance D' is consequently measured even more obliquely than the direct distance D1' with the person 13 further away. As a result, the angle $\upsilon$1 to $\upsilon$ also becomes larger since the geometric relationship between the person 13, the position of the sensor unit 11 at the assembly height h and the reduced horizontal distance D has changed. As a result, the correction value k also changes according to the relationship $D'\cdot k=D$ continuously during the approach of the person 13 towards the door system 100. The correction is therefore carried out continuously during the approach phase of the person 13 towards the door leaf 10 such that the corrected horizontal distance D can be determined for each position during the approach.

The control unit 15 consequently calculates, on the basis of the horizontal distance D, the probable approach time ETA, which has been more accurately determined in this respect. Therefore, the control of the door actuator 16 for moving the door leaf 10 can also be actuated in an improved manner via the control unit 15, in particular in order to determine an optimal opening time, an optimal opening period and a similarly optimal closing time of the door leaf 10.

The design of the disclosure is not restricted to the preferred exemplary embodiment indicated above. In fact, a number of variants is conceivable which make use of the solution represented even in the case of essentially different embodiments. All features and/or advantages emerging from the claims, the description or the drawings, including constructive details or spatial arrangements, may be essential to the disclosure by themselves and in the most varied combinations.

The invention claimed is:

1. A method for operating a door system having a door leaf, which is movable using a door actuator, and having a sensor unit, which is arranged at a height (h) above a floor of the door system and with which an approach of a person towards the door leaf is detected using a control unit, the method comprising:

determining a direct distance (D') between the sensor unit and the person using the sensor unit, determining a horizontal distance (D) between the person and the door leaf by a geometric relationship between a position of the person, a position of the door leaf and a position of the sensor unit, determining a probable approach time (ETA) of the person on the basis of the horizontal distance (D) and opening the door leaf.

2. The method according to claim 1, wherein by the geometric relationship, a correction value (k) is determined which forms a factor between the direct distance (D') and horizontal distance (D) from D'·k=D.

3. The method according to claim 2, wherein the geometric relationship is based on determining an angle (υ) between a first limb in a course of the direct distance (D') and a second limb in a course of the horizontal distance (D).

4. The method according to claim 3, wherein the angle (υ) is determined from: υ=sin−1 (h/D').

5. The method according to claim 3, wherein the correction value (k) is determined from: k=cos (υ).

6. The method according to claim 2, wherein the correction value (k) changes with the approach of the person towards the door system, wherein the correction value (k) is continuously adapted by means of the control unit as a function of a distance of the person from the door system.

7. The method according to claim 2, wherein the door system has the door actuator, which is actuated by the control unit, and/or which includes the control unit, wherein the correction value (k), the horizontal distance (D) and lastly the probable approach time (ETA) are determined with the control unit.

8. The method according to claim 2, wherein the control device has a Random-access memory (RAM) memory in which the correction value (k) is stored.

9. The method according to claim 2, wherein the correction value (k) is only determined when a deviation of the direct distance (D') between the sensor unit and the person and the horizontal distance (D) is more than 10%.

10. The method according to claim 1, wherein when the door system is installed with the door actuator, the height (h) of the sensor unit above the floor is input into the control unit.

11. A door system comprising:

a control unit;

a door leaf, which is movable using a door actuator; and a sensor unit, which is arranged at a height above a floor of the door system and with which an approach of a person towards the door leaf is detected using the control unit;

wherein the control unit is configured to determine a direct distance (D') between the sensor unit and the person using the sensor unit, determine a horizontal distance (D) between the person and the door leaf by a geometric relationship between a position of the person, a position of the door leaf and a position of the sensor unit, determine a probable approach time of the person on the basis of the horizontal distance (D), and open the door leaf.

12. The door system according to claim 11, wherein the door system is designed as an automatic sliding door system, as a folding leaf door system, as a pivot leaf door system, or as a revolving door system.

* * * * *